United States Patent
Nako et al.

(10) Patent No.: US 8,992,698 B2
(45) Date of Patent: Mar. 31, 2015

(54) WELDING METAL HAVING EXCELLENT LOW-TEMPERATURE TOUGHNESS AND DROP-WEIGHT CHARACTERISTICS

(75) Inventors: Hidenori Nako, Kobe (JP); Yoshitomi Okazaki, Kobe (JP); Ken Yamashita, Fujisawa (JP); Minoru Otsu, Fujisawa (JP); Hideaki Takauchi, Fujisawa (JP)

(73) Assignee: Kobe Steel. Ltd., Kobe-shi (JP)

( * ) Notice: Subject to any disclaimer, the term of this patent is extended or adjusted under 35 U.S.C. 154(b) by 309 days.

(21) Appl. No.: 13/640,212

(22) PCT Filed: Apr. 8, 2011

(86) PCT No.: PCT/JP2011/058939
§ 371 (c)(1),
(2), (4) Date: Oct. 9, 2012

(87) PCT Pub. No.: WO2011/126121
PCT Pub. Date: Oct. 13, 2011

(65) Prior Publication Data
US 2013/0028782 A1    Jan. 31, 2013

(30) Foreign Application Priority Data
Apr. 9, 2010  (JP) ................. 2010-090444

(51) Int. Cl.
*C22C 38/42* (2006.01)
*C22C 38/46* (2006.01)
(Continued)

(52) U.S. Cl.
CPC ........... *B23K 35/3066* (2013.01); *C22C 38/001* (2013.01); *C22C 38/002* (2013.01);
(Continued)

(58) Field of Classification Search
None
See application file for complete search history.

(56) References Cited

U.S. PATENT DOCUMENTS

| | | | |
|---|---|---|---|
| 8,043,407 B2 | 10/2011 | Nako et al. | |
| 8,124,247 B2 | 2/2012 | Hayakawa et al. | |
| 2012/0021246 A1 | 1/2012 | Nako et al. | |

FOREIGN PATENT DOCUMENTS

| | | |
|---|---|---|
| CN | 101619408 A | 1/2010 |
| JP | 58 86996 | 5/1983 |

(Continued)

OTHER PUBLICATIONS

Machine-English translation of Japanese Patent No. 2007-260696, Nishimura Satoru et al., Oct. 11, 2007.*
International Search Report Issued Jul. 5, 2011 in PCT/JP11/58939 Filed Apr. 8, 2011.
U.S. Appl. No. 13/574,672, filed Jul. 23, 2012, Nako, et al.

*Primary Examiner* — Deborah Yee
(74) *Attorney, Agent, or Firm* — Oblon, McClelland, Maier & Neustadt, L.L.P.

(57) ABSTRACT

Provided is a welding metal in which the chemical component composition thereof is appropriately controlled; an A value that is specified by a predetermined relational expression satisfies the requirement of being 3.8% to 9.0%; an X value that is specified by a predetermined relational expression satisfies the requirement of being 0.5% or greater; the area percentage of carbide particles having a circle-equivalent diameter of 0.20 μm or greater in the welding metal is 4.0% or less; and the number of carbide particles having a circle-equivalent diameter of 1.0 μm or greater is 1000 particles/mm² or less. This welding metal, which can exhibit not only high strength but also good low-temperature toughness and good drop-weight characteristics, is useful as a material for a pressure vessel in a nuclear power plant.

20 Claims, 1 Drawing Sheet

(Unit:mm)

(51) Int. Cl.
   *C22C 38/50* (2006.01)
   *B23K 35/30* (2006.01)
   *C22C 38/00* (2006.01)
   *C22C 38/02* (2006.01)
   *C22C 38/04* (2006.01)
   *C22C 38/44* (2006.01)
   *C22C 38/58* (2006.01)
   *G21C 13/087* (2006.01)

(52) U.S. Cl.
   CPC ............... *C22C 38/02* (2013.01); *C22C 38/04* (2013.01); *C22C 38/42* (2013.01); *C22C 38/44* (2013.01); *C22C 38/46* (2013.01); *C22C 38/50* (2013.01); *C22C 38/58* (2013.01); *G21C 13/087* (2013.01); *B23K 35/30* (2013.01); *B23K 35/3053* (2013.01)
   USPC ........... 148/335; 420/109; 420/112; 420/119; 219/146.23

(56) References Cited

FOREIGN PATENT DOCUMENTS

| | | |
|---|---|---|
| JP | 60 196286 | 10/1985 |
| JP | 62 40996 | 2/1987 |
| JP | 63 157795 | 6/1988 |
| JP | 3 221294 | 9/1991 |
| JP | 11-100641 A | 4/1999 |
| JP | 11 138293 | 5/1999 |
| JP | 11 192555 | 7/1999 |
| JP | 2001 335879 | 12/2001 |
| JP | 2002 18595 | 1/2002 |
| JP | 2004 315962 | 11/2004 |
| JP | 2008 68274 | 3/2008 |
| JP | 2008 240096 | 10/2008 |
| JP | 2009 101414 | 5/2009 |

\* cited by examiner (a)
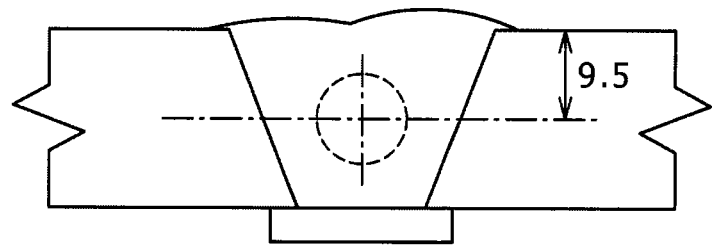
(b)
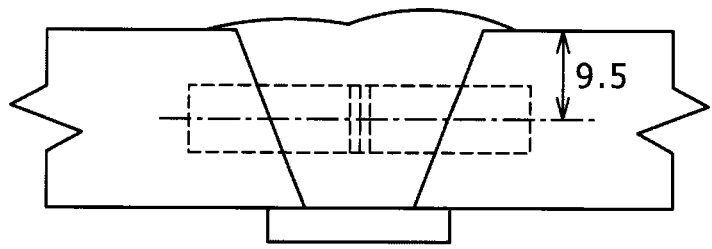
(c)
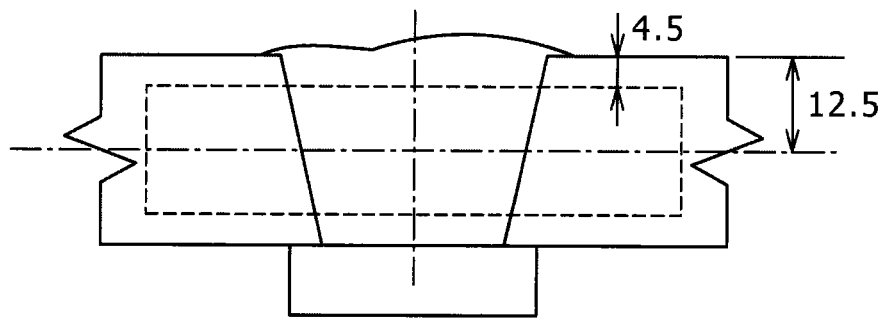
(Unit: mm)

WELDING METAL HAVING EXCELLENT LOW-TEMPERATURE TOUGHNESS AND DROP-WEIGHT CHARACTERISTICS

TECHNICAL FIELD

The present invention relates to a welding metal used for an Mn—Mo—Ni-series welded structure in a nuclear power field, and particularly relates to a welding metal having excellent low-temperature toughness and drop-weight characteristics.

BACKGROUND ART

Mn—Mo—Ni steel has been known to have excellent strength and toughness, and is mainly used as a material for, for example, a pressure vessel of a nuclear power plant. Such a material has been required to have a toughness level that is increasingly raised from the viewpoint of safety. For example, higher low-temperature toughness is required for a cask used for storage/transport of spent fuel from a nuclear power plant. In addition, higher drop-weight characteristics at low temperature are required for the cask to ensure safety against failure. In step with these, Mn—Mo—Ni-series welding metals used for such applications are also required to be further improved in strength, low-temperature toughness, and drop-weight characteristics.

A welded structure including the Mn—Mo—Ni-series welding metal (an Mn—Mo—Ni-series welded structure) is subjected to long annealing for stress relief after welding (hereinafter, referred to as SR annealing), and carbide particles are precipitated during the SR annealing, causing variations in characteristics of the welding metal. Hence, there is a need of establishment of a technique for improving strength, low-temperature toughness, and drop-weight characteristics depending on conditions of SR annealing.

For example, Ni-based-alloy welding materials as disclosed in Patent Literature 1 and 9%-Ni-based-alloy welding materials as disclosed in Patent Literature 2 are known to be effective for improvement in low-temperature toughness of a welding metal. However, the Ni-based-alloy welding materials are disadvantageous in cost since the materials contain a large amount of expensive Ni. In addition, the 9%-Ni-based-alloy welding materials each have a stable austenite structure formed during SR annealing, causing a significant reduction in yield stress. Hence, there is a need of a technique that further improves strength, low-temperature toughness, and drop-weight characteristics of the welding metal while controlling the Ni content at a low level.

High toughness is expected in TIG welding having a low oxygen content. However, the TIG welding has a disadvantage of low construction efficiency. Hence, industrially, a technique ensuring high strength, low-temperature toughness, and drop-weight characteristics is desired in high efficient welding construction such as submerge arc welding having a high oxygen content.

On the other hand, for example, Patent Literature 3 discloses a certain effect of improving low-temperature toughness of a welding metal through formation of a fine acicular-ferrite structure nucleating on Ti-based oxide. In this technique, however, the lowest temperature at which sufficient low-temperature toughness is obtained is still not so low, $-60°$ C. If a larger amount of Ti-based oxide is dispersed for further improvement in low-temperature toughness, coarse Ti oxide, which acts as origin of the fracture, increases. Hence, further devising is required. Patent Literature 4 discloses a method for achieving a welding metal having excellent drop-weight characteristics through controlling flux components and wire components in submerge arc welding. This technique, however, does not assume SR annealing. As a result, the lowest no-break performance temperature of the drop-weight characteristics is still not so low, $-90°$ C. Furthermore, a welding metal having excellent toughness is obtained through controlling the Ni content as disclosed in Patent Literature 5 and welding metal having excellent toughness by using Ti as disclosed in Patent Literature 6. However, similarly to Patent Literature 4, both Literatures do not assume SR annealing.

As a technique in consideration of toughness after SR annealing, a technique disclosed in Patent Literature 7 is proposed. A level of toughness obtained after the SR annealing is about an absorbed energy of 55 J at $-75°$ C. in the best case. This toughness still needs further improvement. Furthermore, effect of this technique to drop-weight characteristics is unknown. Patent Literature 8 discloses a technique for improving toughness of a high strength MIG welding metal by controlling a wire composition and a shield gas component. The ensured temperature, however, is still not so low, $-50°$ C. Furthermore, effect of this technique to drop-weight characteristics is unknown. Moreover, Patent Literature 9 discloses a technique for achieving high strength and toughness by applying thermal treatment of quenching and tempering to a welding metal. However, application of quenching to the welding metal causes extremely cumbersome process.

CITATION LIST

Patent Literature

[PTL 1] Japanese Unexamined Patent Application Publication No. H11-138293
[PTL 2] Japanese Unexamined Patent Application Publication No. 2009-101414
[PTL 3] Japanese Unexamined Patent Application Publication No. 2004-315962
[PTL 4] Japanese Unexamined Patent Application Publication No. H11-192555
[PTL 5] Japanese Unexamined Patent Application Publication No. 2001-335879
[PTL 6] Japanese Unexamined Patent Application Publication No. S60-196286
[PTL 7] Japanese Unexamined Patent Application Publication No. S63-157795
[PTL 8] Japanese Unexamined Patent Application Publication No. H3-221294
[PTL 9] Japanese Unexamined Patent Application Publication No. S58-86996

SUMMARY OF THE INVENTION

Problems that the Invention is to Solve

The present invention has been made in the view of such circumstances, and an object of the present invention is to provide a welding metal that has high-strength, good low-temperature toughness, and good drop-weight characteristics so as to be useful as a material for a pressure vessel of a nuclear power plant.

Means for Solving the Problems

A welding metal according to the present invention, which solves the above-described problem, is summarized in containing C of 0.02% to 0.10% (by mass %, the same holds true for each chemical component composition described below); Si of 0.5% or less (excluding 0%); Mn of 1.0% to 1.9%; Ni of 2.7% to 8.0%; Cr of 0.7% or less (excluding 0%); Mo of 0.05% to 0.8%; Ti of 0.010% to 0.060%; N of 0.010% or less (excluding 0%); and O of 0.015% to 0.060%, wherein the total content of Cr and Mo is 0.8% or less (excluding 0%); the remainder consists of iron and inevitable impurities, an A value as specified by the following formula (1) is 3.8% to 9.0%; an X value as specified by the following formula (2) is 0.5 or greater, and the surface area percentage of carbide particles having a circle-equivalent diameter of 0.20 μm or greater in the welding metal is 4.0% or less, and the number of carbide particles having a circle-equivalent diameter of 1.0 μm or greater is 1000 particles/mm$^2$ or less.

$$A \text{ value}=0.8\times[C]-0.05\times[Si]+0.5\times[Mn]+0.5\times[Cu]+[Ni]-0.5\times[Mo]+0.2\times[Cr] \quad (1),$$

where [C], [Si], [Mn], [Cu], [Ni], [Mo], and [Cr] are contents (by mass percent) of C, Si, Mn, Cu, Ni, Mo, and Cr in the welding metal, respectively.

$$X \text{ value}=[Ti]/([O]-1.1\times[Al]+0.05\times[Si]) \quad (2),$$

where [Ti], [O], [Al], and [Si] are contents (by mass percent) of Ti, O, Al, and Si in the welding metal, respectively.

In the present invention, the term "circle-equivalent diameter" means a diameter of a circle having the same area as that of a carbide particle in order to indicate the size of the carbide particle in terms of the circle.

The welding metal according to the present invention preferably has a B value as specified by the following formula (3) of 0.35% or less, thus leading to a further reduction in the surface area percentage of carbide particles having a circle-equivalent diameter of 0.20 μm or greater and further improvement in low-temperature toughness and drop-weight characteristics:

$$B \text{ value}=[C]\times(2\times[Mn]+3\times[Cr]) \quad (3),$$

where [C], [Mn], and [Cr] are contents (by mass percent) of C, Mn, and Cr in the welding metal, respectively.

[C] being the C content and [Mo] being the Mo content in the welding metal according to the present invention preferably satisfies a relationship of the following formula (4). Hence, the number of carbide particles having a circle-equivalent diameter of 1.0 μm or greater can further be reduced and low-temperature toughness and drop-weight characteristics can further be improved.

$$0.01+2.2\times[C]<[Mo]<0.2+15\times[C] \quad (4)$$

The welding metal according to the present invention usefully contains other elements such as (a) Cu of 0.35% or less (excluding 0%), (b) Al of 0.030% or less (excluding 0%), (c) Nb of 0.030% or less (excluding 0%) and/or V of 0.10% or less (excluding 0%) as necessary. This further improves the characteristics of the welding metal depending on types of the elements.

A welded structure having a welding metal having excellent low-temperature toughness and drop-weight characteristics can be achieved by including the welding metal as described above.

Effect of the Invention

According to the present invention, a chemical component composition of a welding metal is appropriately controlled while the relationships expressed by the formula (1) and the formula (2) are satisfied, thus achieving a welding metal having high strength (tensile strength), good low-temperature toughness, and good drop-weight characteristics. Such a welding metal is useful as a material for a pressure vessel of a nuclear power plant, or a material for a cask.

BRIEF DESCRIPTION OF DRAWINGS

[FIG. 1] FIG. 1(a) is a schematic view illustrating a sampling position of a tensile test piece of a welding metal; FIG. 1(b) is a schematic view illustrating a sampling position of a Charpy impact test piece of a welding metal; and FIG. 1(c) is a schematic view illustrating a sampling position of a drop-weight test piece of a welding metal.

MODE FOR CARRYING OUT THE INVENTION

The inventors have investigated means for achieving a welding metal having high oxygen content ensuring excellent strength, low-temperature toughness, and drop-weight characteristics from a variety of angles. As a result, the inventors have found that strength, low-temperature toughness, and drop-weight characteristics can be improved by increasing formation of the fine reheated-structures formed during welding, fining structures of as-welded zone (structures being not re-heated) through generation of acicular-ferrite structures nucleating on oxides, and further reducing the coarse carbide particles, and have achieved the present invention.

The inventors have found that a chemical component composition of a welding metal is controlled to be within a predetermined range, an A value (formula (1)) and an X value (formula (2)) described below obtained from the chemical components are controlled to be 3.8% to 9.0%, and 0.5 or greater, respectively, and the surface area percentage of carbide particles having a circle-equivalent diameter of 0.20 μm or greater in the welding metal is controlled to be 4.0% or less, and the number of carbide particles having a circle-equivalent diameter of 1.0 μm or greater is 1000 particles/mm$^2$ or less, thus achieving the welding metal having excellent strength, low-temperature toughness, and drop-weight characteristics.

Furthermore, the inventors have found that a value B (formula (3)) described below, which is obtained from the chemical components as necessary, is controlled to be 0.35% or less, so that the surface area percentage of carbide particles having a circle-equivalent diameter of 0.20 μm or greater can be further reduced, or [C] being the C content and [Mo] being the Mo content satisfy the relationship expressed by the following formula (4), so that the number of carbide particles having a circle-equivalent diameter of 1.0 μm or greater can be reduced, leading to further improvement in strength, low-temperature toughness, and drop-weight characteristics of the welding metal.

$$B \text{ value}=[C]\times(2\times[Mn]+3\times[Cr]) \quad (3),$$

where [C], [Mn], and [Cr] are contents (by mass percent) of C, Mn, and Cr in the welding metal, respectively.

$$0.01+2.2\times[C]<[Mo]<0.2+15\times[C] \quad (4)$$

A welding material component and a welding condition need to be appropriately controlled in order to achieve the welding metal of the present invention. It will be appreciated that the components of the welding material are restricted by the components of the welding metal to be required. In addition, the welding condition and the welding material components need to be appropriately controlled in order to achieve the predetermined form of carbide particles. For example, in the case where welding heat input is 2.5 kJ/mm to 4.0 kJ/mm, and preheating/interpass temperature is 150° C. to 240° C., a β value expressed by the following formula (5) is preferably controlled to be 0.40% or less. This facilitates control of the surface area percentage of carbide particles having a circle-equivalent diameter of 0.20 μm or greater in the welding metal to be 4.0% or less.

$$\beta \text{ value}=(C)\times\{1.5\times(Mn)+2.3\times(Cr)\} \quad (5),$$

where (C), (Mn), and (Cr) are contents (by mass percent) of C, Mn and, Cr in the welding metal, respectively.

The size of carbide particle is also affected by a structure of a welding metal matrix. Specifically, as the welding metal matrix is finer, the carbide particle size is generally reduced due to an increase in the number of generation sites of carbide particles. Hence, if welding heat input is lower than the above range, or the preheating/interpass temperature decreases, cooling rate increases during welding, leading to a finer matrix structure. Consequently, the 6 value should be satisfied in a wider range. Conversely, if welding heat input increases, or the preheating/interpass temperature increases, the 6 value is preferably controlled to be within a narrower range. The welding heat input and the preheating/interpass temperature, which are parameters having influence on the characteristics such as strength of a welding metal, are each controlled to be within an appropriate range according to required characteristics.

While an SR annealing condition generally affects a form of the carbide particles, temperature and time during SR annealing should be controlled within a range of $17\times10^3$ to $19\times10^3$ in terms of Larson-Miller parameter (LMP) expressed by the following formula (6) for the form of the carbide particles in the welding metal of the present invention.

$$LMP=(T+273)\times(20+\log t) \quad (6),$$

where T denotes SR annealing temperature (° C.), and t denotes SR annealing time (hours).

LMP of larger than $19\times10^3$ accelerates growth of carbide particles, thus preventing formation of carbide particles having a predetermined form. LMP of smaller than $17\times10^3$ extremely increases strength, and thus a welding metal cannot have good low-temperature toughness and drop-weight characteristics. For example, LMP is $17.3\times10^3$ for SR annealing at 565° C. for 4 hours, and LMP is $18.7\times10^3$ for SR annealing at 615° C. for 12 hours.

The welding metal of the present invention is required to have a chemical component composition being appropriately controlled, and to satisfy the requirement for the A value, which is specified by the formula (1) with the content of each of elements C, Si, Mn, Cu, Ni, Mo and Cr, to be 3.8% to 9.0%.

$$A \text{ value}=0.8\times[C]-0.05\times[Si]+0.5\times[Mn]-0.5\times[Cu]+[Ni]-0.5\times[Mo]+0.2\times[Cr] \quad (1),$$

where [C], [Si], [Mn], [Cu], [Ni], [Mo], and [Cr] are contents (by mass percent) of C, Si, Mn, Cu, Ni, Mo, and Cr in the welding metal, respectively.

While the formula (1) includes an element (for example, Cu) that is contained as necessary, the A value can be calculated excluding the term of the element for the welding metal without the element, and can be calculated from the formula (1) for the welding metal containing the element.

The A value is a parameter as an index of transformation temperature of a welding metal. The transformation temperature decreases with an increase in the A value. This in turn accelerates reverse transformation during welding, leading to an increase in the area of fine reheated-zones. An A value of smaller than 3.8% prevents the effect of the welding metal of the present invention from being shown. An A value of larger than 9.0% causes formation of a fresh martensite structure through SR annealing, leading to a reduction in low-temperature toughness and in drop-weight characteristics. The lower limit of the A value is preferably 4.5% or less, and the upper limit thereof is preferably 8.0% or less.

The welding metal of the present invention is also required to satisfy the requirement for an X value, which is specified by the formula (2) with the content of each of elements Ti, O, Al and Si, to be 0.5 or greater.

$$X \text{ value}=[Ti]/([O]-1.1\times[Al]+0.05\times[Si]) \quad (2),$$

where [Ti], [O], [Al], and [Si] are contents (by mass percent) of Ti, O, Al, and Si in the welding metal, respectively.

While the formula (2) includes an element (for example, Al) that is contained as necessary, the X value can be calculated excluding the term of the element for the welding metal without the element, and can be calculated from the formula (2) for the welding metal containing the element.

The X value is a parameter specifying Ti oxide on which acicular-ferrite nucleates. An X value of smaller than 0.5 causes formation of Si oxide over a surface of Ti oxide, leading to a reduction in generation ability of acicular-ferrite. The lower limit of the X value is preferably 0.6 or greater.

The welding metal of the present invention is required to have the surface area percentage of 4.0% or less of carbide particles having a circle-equivalent diameter of 0.20 μm or greater in the welding metal. If the surface area percentage is larger than 4.0%, coarse carbide particles are generated and accelerates development of cracks, leading to degradation in low-temperature toughness and in drop-weight characteristics. The surface area percentage is preferably 3.5% or less.

The B value as specified by the following formula (3) is a parameter indicating stability of the carbide particles. The B value is controlled to be 0.35% or less, so that generation of coarse carbide particles is suppressed, which preferably leads to further improvement in low-temperature toughness and drop-weight characteristics of the welding metal. The upper limit of the B value is more preferably 0.30% or less.

$$B \text{ value}=[C]\times(2\times[Mn]+3\times[Cr]) \quad (3),$$

where [C], [Mn], and [Cr] are contents (by mass percent) of C, Mn, and Cr in the welding metal, respectively.

The welding metal of the present invention is required to have the number of carbide particles of 1000 particles/mm$^2$ or less of carbide particles having a circle-equivalent diameter of 1.0 μm or greater in the welding metal. A large number of carbide particles having a circle-equivalent diameter of 1.0 μm or greater act as origin of the fracture, leading to degradation in low-temperature toughness and in drop-weight characteristics. From such viewpoint, the number of the carbide particles is required to be 1000 particles/mm$^2$ or less, and preferably 100 particles/mm$^2$ or less (more preferably 50 particles/mm$^2$ or less).

The following formula (4) represents parameters controlling a form of carbide particles. [C] of the C content and [Mo] of the Mo content satisfy a relationship expressed by the formula (4), so that coarse carbide particles having a circle-equivalent diameter of 1.0 μm or greater are not easily formed, which preferably leads to further improvement in low-temperature toughness and drop-weight characteristics of the welding metal.

$$0.01+2.2\times[C]<[Mo]<0.2+15\times[C] \quad (4)$$

Strictly, an approximate composition of a welding metal is determined by a composition and an amount of weld penetration of Mn—Mo—Ni steel being a base material, a composition and an amount of welding penetration of a welding material (a welding wire), and basicity of flux used in welding. The approximate amounts of weld penetration can be determined by a composition of a weld connection part of the base material and the basicity of the flux during welding. On the other hand, the approximate composition of the welding material can be determined by a composition of a target welding metal and the basicity of the flux. Usually, welding is performed so as to maintain a basicity of flux of about 2.5 to 2.6.

The basic component composition of the welding metal of the present invention will now be described. Even if the welding metal of the present invention has a chemical component composition having the A value as specified by the formula (1) and the X value as specified by the formula (2) within the predetermined range, the welding metal, of which the content of each component (element) is not within the appropriate range, cannot have excellent mechanical characteristics. Hence, the following is required for the welding metal of the present invention: the A value (value of the formula (1)), which is specified with the appropriate content of each of elements C, Si, Mn, Cu, Ni, Mo and Cr, and the X value (value of the formula (2)), which is specified with the appropriate content of each of elements Ti, O, Al and Si, are controlled to be within the predetermined range, and furthermore the content of each chemical component is within the appropriate range as described below. The range of the content of each component is specified according to the following reason.

[C: 0.02% to 0.10%]

C is an essential element for the welding metal to have certain strength. In addition, C is an effective element for decreasing the transformation temperature of the welding metal to increase the area of fine reheated-zones in order to improve low-temperature toughness and drop-weight characteristics of the welding metal. The C content must be 0.02% or more to effectively show such effects of C. An excessive C content, however, leads to coarsening of carbide particles, causing degradation in low-temperature toughness and drop-weight characteristics of the welding metal. Hence, the C content must be 0.10% or less. The lower limit of the C content is preferably 0.04% or more (more preferably 0.05% or more), and the upper limit thereof is preferably 0.08% or less (more preferably 0.07% or less).

[Si: 0.5% or Less (Excluding 0%)]

Si is an essential element for the welding metal to have certain strength. An excessive Si content, however, leads to an excessive increase in strength or an increase in a hard structure such as a martensite structure, causing degradation in low-temperature toughness and drop-weight characteristics of the welding metal. Hence, the Si content must be 0.5% or less. The lower limit of the Si content is preferably 0.05% or more, and the upper limit thereof is preferably 0.40% or less (more preferably 0.30% or less).

[Mn: 1.0% to 1.9%]

Mn is an essential element for the welding metal to have certain strength. In addition, Mn is effective for decreasing the transformation temperature of the welding metal to increase the area of fine reheated-zones in order to improve low-temperature toughness and drop-weight characteristics of the welding metal. The Mn content must be 1.0% or more to effectively show such effects of Mn. The Mn content is preferably 1.2% or more (more preferably 1.3% or more). An excessive Mn content, however, leads to an excessive increase in strength and to coarsening of carbide particles, causing degradation in low-temperature toughness and drop-weight characteristics of the welding metal. Hence, the Mn content must be 1.9% or less. The Mn content is preferably 1.8% or less (more preferably 1.7% or less).

[Ni: 2.7% to 8.0%]

Ni is an effective element for decreasing the transformation temperature of the welding metal to increase the area of fine reheated-zones in order to improve low-temperature toughness and drop-weight characteristics of the welding metal. The Ni content must be 2.7% or more to effectively show such effects of Ni. The Ni content is preferably 3.0% or more (more preferably 4.0% or more). An excessive Ni content, however, leads to formation of a fresh martensite structure during SR annealing, causing a reduction in low-temperature toughness and drop-weight characteristics of the welding metal. Hence, the Ni content must be 8.0% or less. The Ni content is preferably 7.0% or less (more preferably 6.0% or less).

[Cr: 0.7% or Less (Excluding 0%)]

Cr is an effective element for the welding metal to have certain strength. In addition, Cr decreases the transformation temperature of the welding metal and thus increases the area of fine reheated-zones, leading to improvement in low-temperature toughness and drop-weight characteristics of the welding metal. An excessive Cr content, however, accelerates coarsening of carbide particles, causing degradation in low-temperature toughness and drop-weight characteristics of the welding metal. Hence, the Cr content must be 0.7% or less. The Cr content is preferably 0.6% or less (more preferably 0.5% or less). The lower limit of Cr content is preferably 0.05% or more (more preferably 0.1% or more) to effectively show the effects of Cr.

[Mo: 0.05% to 0.8%]

Mo is an effective element for improving strength of the welding metal through formation of fine carbide particles during SR annealing. The Mo content must be 0.05% or more to effectively show such effect of Mo. An insufficient Mo content reduces strength after SR annealing and stabilizes coarse cementite, leading to degradation in low-temperature toughness and drop-weight characteristics of the welding metal. The Mo content is preferably 0.1% or more (more preferably 0.2% or more). An excessive Mo content, however, accelerates coarsening of carbide particles, causing a reduction in low-temperature toughness and drop-weight characteristics of the welding metal. Hence, the Mo content must be 0.8% or less. The Mo content is preferably 0.6% or less (more preferably 0.5% or less).

[Cr+Mo: 0.8% or Less (Excluding 0%)]

Cr and Mo are each a carbide-forming element, and each improves strength of the welding metal through formation of fine carbide particles during SR annealing. However, an excessive total content of Cr and Mo of more than 0.8% leads to formation of a large amount of carbide, causing degradation in low-temperature toughness and drop-weight characteristics of the welding metal. The lower limit of the total content of Cr and Mo is preferably 0.10% or more (more preferably 0.15% or more), and the upper limit thereof is preferably 0.7% or less (more preferably 0.65% or less).

[Ti: 0.010% to 0.060%]

Ti is an effective element for improving strength, low-temperature toughness, and drop-weight characteristics of the welding metal after SR annealing through formation of Ti oxide and generation of a fine acicular-ferrite structure. The Ti content must be 0.010% or more to effectively show such effects of Ti. The Ti content is preferably 0.015% or more (more preferably 0.020% or more). An excessive Ti content, however, leads to coarsening of oxide, causing degradation in low-temperature toughness and drop-weight characteristics of the welding metal. Hence, the Ti content is preferably 0.060% or less. The Ti content is more preferably 0.05% or less (further preferably 0.04% or less).

[N: 0.010% or Less (Excluding 0%)]

N is an effective element for improving strength of the welding metal through formation of nitride (or carbonitride) with Ti or each of elements including Nb and V contained as necessary. An excessive N content, however, increases the amount of single nitrogen (dissolved nitrogen) instead of nitride, which impairs toughness of the welding metal. Hence, the N content must be 0.010% or less. The N content is preferably 0.0080% or less.

[O: 0.015% to 0.060%]

O is an essential element for formation of Ti oxide. The O content must be 0.015% or more to form sufficient amount of Ti oxide. The O content is preferably 0.020% or more (more preferably 0.025% or more). Too much excessive O content, however, increases coarse oxide, which acts as origin of brittle fracture, causing a reduction in low-temperature toughness of the welding metal. Hence, the O content must be 0.060% or less. The O content is preferably 0.050% or less (more preferably 0.045% or less).

The contained elements specified by the present invention are as described above, and the remainder consists of iron and inevitable impurities. The inevitable impurities include elements such as P, S, B, Sn, Zr, Bi, and Pb, which are allowed to be mixed in depending on raw materials, other materials, and situations of production facilities. Co is radioactivated through neutron irradiation in a structure for nuclear power application. Hence the content of Co of the welding metal is required to be regulated to 0.05% or less, and the content of Co of a welding wire is also required to be 0.05% or less. The welding metal of the present invention usefully contains other elements such as (a) Cu of 0.35% or less (excluding 0%), (b) Al of 0.030% or less (excluding 0%), (c) Nb of 0.030% or less (excluding 0%), and/or V of 0.10% or less (excluding 0%) as necessary. This further improves the characteristics of the welding metal depending on types of the elements.

[Cu: 0.35% or Less (Excluding 0%)]

Cu is an effective element for improving strength of the welding metal. In addition, Cu decreases the transformation temperature of the welding metal and thus increases the area of fine reheated-zones, leading to improvement in low-temperature toughness and drop-weight characteristics of the welding metal. An excessive Cu content, however, leads to an excessive increase in strength, which impairs low-temperature toughness and drop-weight characteristics of the welding metal. Hence, the Cu content is preferably 0.35% or less. The Cu content is more preferably 0.30% or less (further preferably 0.25% or less). The lower limit of the Cu content is preferably 0.02% or more (more preferably 0.05% or more) to effectively show the effects of Cu.

[Al: 0.030% or Less (Excluding 0%)]

Although Al is an effective element as a deoxidizer, an excessive Al content, more than 0.030%, causes coarsening of oxide, which impairs low-temperature toughness of the welding metal. The Al content is more preferably 0.025% or less (further preferably 0.02% or less). The lower limit of the Al content is preferably 0.005% or more to effectively show the effects of Al.

[Nb: 0.030% or Less (Excluding 0%) and/or V: 0.10% or Less (Excluding 0%)]

Nb and V are each an effective element for improving strength of the welding metal through formation of carbonitride. An excessive content of each element, however, causes degradation in low-temperature toughness and drop-weight characteristics of the welding metal. Hence, the Nb content is preferably 0.030% or less (more preferably 0.02% or less), and the V content is preferably 0.10% or less (more preferably 0.08% or less). To effectively show the effects of these elements, the lower limit of the Nb content is preferably 0.008% or more (more preferably 0.01% or more), and that of the V content is preferably 0.010% or more (more preferably 0.02% or more).

A welded structure having a welding metal having excellent low-temperature toughness and drop-weight characteristics can be achieved by including the above-described welding metal.

EXAMPLE

While the present invention will be described further in detail with Examples hereinafter, the Examples are not intended to limit the present invention, and appropriate alterations can be made within the scope without departing from the gist as described above and below, all of which are included in the technical scope of the present invention.

Submerge arc welding was performed under the following welding conditions using various types of welding wires having a diameter of 4.0 mm (W1 to W36 in Table 1 and Table 2), each welding wire having a β value (the formula (5)), which was obtained from its composition (the content of each of C, Mn, and Cr), of 0.11% to 0.41%.

The chemical component composition of a base material (a welding base material) used in the submerge arc welding is as shown in Table 3 described below and the chemical component composition of flux is as shown in Table 4 described below. Basicity shown in Table 4 is basically calculated based on the following formula, which is recommended by IIW (International Institution of Welding), where each oxide represents mass percent of each of the oxide.

Basicity=BC/AC $BC=CaF_2+CaO+MgO+BaO+SrO+Na_2O+K_2O+LiO+(MnO+FeO)/2$ $AC=SiO_2+(Al_2O_3+TiO_2+ZrO_2)/2$

[Welding Condition]

Base metal thickness: 25 mm;
Groove shape: V groove (angle: 10°);
Root gap: 20 mm;
Welding position: Flat;
Wire diameter: 4.0 mm;
Welding heat input: 2.9 kJ/mm (550 A–31 V, 35 cpm);
Preheating/interpass temperature: 160° C. to 220° C.; and
Number of layers: 6 layers (12 passes).

TABLE 1

| Welding wire No. | Chemical component composition of welding wire * (percent by mass) | | | | | | | | | | | | |
|---|---|---|---|---|---|---|---|---|---|---|---|---|---|
| | C | Si | Mn | Ni | Cr | Mo | Ti | N | Cu | Al | Nb | V | β value |
| W1 | 0.10 | 0.15 | 1.7 | 3.8 | 0.59 | 0.19 | 0.15 | 0.0045 | — | — | — | — | 0.39 |
| W2 | 0.10 | 0.14 | 1.8 | 4.3 | 0.54 | 0.24 | 0.13 | 0.005 | — | — | — | — | 0.39 |
| W3 | 0.08 | 0.20 | 1.5 | 4.6 | 0.17 | 0.16 | 0.19 | 0.0051 | — | — | — | — | 0.21 |
| W4 | 0.05 | 0.18 | 1.7 | 4.3 | 0.12 | 0.7 | 0.14 | 0.0055 | — | — | — | — | 0.14 |
| W5 | 0.10 | 0.15 | 1.6 | 3.1 | 0.43 | 0.46 | 0.19 | 0.0049 | — | — | — | — | 0.34 |
| W6 | 0.10 | 0.15 | 1.6 | 3.1 | 0.35 | 0.33 | 0.15 | 0.005 | — | — | — | — | 0.32 |

TABLE 1-continued

| Welding wire No. | Chemical component composition of welding wire * (percent by mass) | | | | | | | | | | | | |
|---|---|---|---|---|---|---|---|---|---|---|---|---|---|
| | C | Si | Mn | Ni | Cr | Mo | Ti | N | Cu | Al | Nb | V | β value |
| W7 | 0.09 | 0.15 | 1.7 | 3.6 | 0.36 | 0.24 | 0.15 | 0.0052 | — | — | — | — | 0.30 |
| W8 | 0.09 | 0.16 | 1.7 | 4.9 | 0.36 | 0.25 | 0.15 | 0.0055 | — | — | — | — | 0.30 |
| W9 | 0.05 | 0.14 | 1.9 | 4.4 | 0.4 | 0.13 | 0.15 | 0.0055 | 0.12 | — | — | — | 0.19 |
| W10 | 0.06 | 0.15 | 1.8 | 3.3 | 0.4 | 0.15 | 0.16 | 0.0055 | 0.13 | — | — | — | 0.22 |
| W11 | 0.07 | 0.15 | 1.6 | 5.0 | 0.1 | 0.23 | 0.16 | 0.0053 | — | — | — | — | 0.18 |
| W12 | 0.12 | 0.16 | 1.5 | 5.0 | 0.25 | 0.24 | 0.18 | 0.0056 | — | — | — | — | 0.34 |
| W13 | 0.08 | 0.53 | 1.4 | 5.2 | 0.05 | 0.17 | 0.19 | 0.0048 | — | — | — | 0.043 | 0.18 |
| W14 | 0.07 | 0.18 | 1.1 | 5.1 | 0.2 | 0.21 | 0.2 | 0.0051 | — | — | — | — | 0.15 |
| W15 | 0.05 | 0.25 | 1.9 | 6.3 | 0.25 | 0.22 | 0.19 | 0.005 | — | — | — | — | 0.17 |
| W16 | 0.06 | 0.18 | 1.6 | 7.5 | 0.25 | 0.22 | 0.16 | 0.0044 | — | — | 0.028 | — | 0.18 |
| W17 | 0.05 | 0.35 | 1.6 | 2.8 | 0.69 | 0.11 | 0.21 | 0.0053 | 0.25 | — | 0.02 | — | 0.20 |
| W18 | 0.11 | 0.35 | 1.7 | 4.8 | 0.18 | 0.47 | 0.08 | 0.0056 | — | 0.05 | — | 0.091 | 0.33 |
| W19 | 0.09 | 0.40 | 1.6 | 6.1 | 0.25 | 0.2 | 0.25 | 0.0052 | — | — | — | — | 0.27 |

* Remainder: iron and inevitable impurities

TABLE 2

| Welding wire No. | Chemical component composition of welding wire * (percent by mass) | | | | | | | | | | | | |
|---|---|---|---|---|---|---|---|---|---|---|---|---|---|
| | C | Si | Mn | Ni | Cr | Mo | Ti | N | Cu | Al | Nb | V | β value |
| W20 | 0.13 | 0.20 | 1.6 | 5.0 | 0.05 | 0.34 | 0.17 | 0.0042 | — | — | — | — | 0.33 |
| W21 | 0.07 | 0.65 | 1.6 | 4.2 | 0.09 | 0.42 | 0.19 | 0.0054 | — | — | — | — | 0.18 |
| W22 | 0.06 | 0.15 | 1.0 | 3.9 | 0.20 | 0.24 | 0.16 | 0.0045 | — | — | — | — | 0.12 |
| W23 | 0.06 | 0.33 | 2.2 | 4.5 | 0.35 | 0.10 | 0.08 | 0.0045 | — | — | — | — | 0.25 |
| W24 | 0.06 | 0.24 | 1.8 | 2.5 | 0.48 | 0.24 | 0.11 | 0.0051 | 0.26 | — | — | — | 0.23 |
| W25 | 0.05 | 0.43 | 1.2 | 8.3 | 0.31 | 0.33 | 0.12 | 0.0048 | — | — | — | — | 0.13 |
| W26 | 0.08 | 0.35 | 1.5 | 5.1 | 0.89 | 0.32 | 0.13 | 0.0057 | — | — | — | — | 0.34 |
| W27 | 0.07 | 0.15 | 1.6 | 3.8 | 0.39 | 0.05 | 0.15 | 0.006 | — | — | — | — | 0.23 |
| W28 | 0.07 | 0.20 | 1.5 | 4.8 | 0.57 | 0.06 | 0.15 | 0.0044 | — | — | — | — | 0.25 |
| W29 | 0.05 | 0.22 | 1.4 | 4.0 | 0.05 | 0.95 | 0.20 | 0.0049 | 0.11 | — | — | — | 0.11 |
| W30 | 0.06 | 0.21 | 1.4 | 3.9 | 0.62 | 0.33 | 0.23 | 0.0054 | — | — | — | — | 0.21 |
| W31 | 0.04 | 0.10 | 1.6 | 4.3 | 0.40 | 0.23 | 0.03 | 0.005 | — | — | — | — | 0.13 |
| W32 | 0.09 | 0.15 | 1.8 | 8.1 | 0.72 | 0.08 | 0.30 | 0.0046 | 0.3 | — | — | — | 0.39 |
| W33 | 0.08 | 0.24 | 1.5 | 3.0 | 0.08 | 0.42 | 0.12 | 0.0042 | — | 0.065 | — | — | 0.19 |
| W34 | 0.06 | 0.15 | 1.2 | 4.6 | 0.35 | 0.32 | 0.15 | 0.0054 | — | — | — | — | 0.16 |
| W35 | 0.08 | 0.16 | 1.6 | 4.3 | 0.30 | 0.33 | 0.15 | 0.0142 | — | — | — | — | 0.25 |
| W36 | 0.10 | 0.21 | 1.8 | 3.7 | 0.59 | 0.22 | 0.15 | 0.0045 | 0.43 | — | — | — | 0.41 |

* Remainder: iron and inevitable impurities

TABLE 3

| Chemical component composition of welding base metal * (percent by mass) | | | | | | | | | | | | |
|---|---|---|---|---|---|---|---|---|---|---|---|---|
| C | Si | Mn | P | S | Cu | Al | Ni | Cr | Mo | V | Ti | Nb |
| 0.1 | 0.21 | 1.33 | 0.008 | 0.003 | 0.03 | 0.028 | 0.55 | 0.09 | 0.47 | 0.005 | 0.004 | 0.005 |

* Remainder: iron and inevitable impurities

TABLE 4

| Chemical component composition of flux * (percent by mass) | | | | | | | |
|---|---|---|---|---|---|---|---|
| Type of flux | $SiO_2$ | $Al_2O_3$ | MgO | $CaF_2$ | CaO | Others | Basicity |
| F1 | 15 | 20 | 30 | 20 | 10 | 5 | 2.55 |
| F2 | 15 | 25 | 25 | 20 | 10 | 5 | 2.04 |

The chemical component composition of each of the resultant welding metals is shown in the following Tables 5 and 6 together with the A value, the X value, the B value, satisfying the formula (4) or not (determination of the Mo content) and the basicity of the flux.

TABLE 5

| Experimental No. | Welding wire No. | Chemical component composition of welding metal* (percent by mass) | | | | | | | | |
|---|---|---|---|---|---|---|---|---|---|---|
| | | C | Si | Mn | Ni | Cr | Mo | Cr + Mo | Ti | O | N |
| 1 | W1 | 0.08 | 0.13 | 1.7 | 3.8 | 0.56 | 0.15 | 0.71 | 0.032 | 0.028 | 0.0049 |
| 2 | W2 | 0.08 | 0.11 | 1.8 | 4.3 | 0.51 | 0.22 | 0.73 | 0.024 | 0.035 | 0.0056 |
| 3 | W3 | 0.07 | 0.18 | 1.4 | 4.5 | 0.13 | 0.12 | 0.25 | 0.038 | 0.028 | 0.0061 |
| 4 | W4 | 0.03 | 0.15 | 1.6 | 4.2 | 0.08 | 0.68 | 0.76 | 0.028 | 0.031 | 0.0063 |
| 5 | W5 | 0.07 | 0.12 | 1.6 | 3.1 | 0.38 | 0.41 | 0.79 | 0.039 | 0.029 | 0.0055 |
| 6 | W6 | 0.07 | 0.11 | 1.6 | 3.1 | 0.31 | 0.32 | 0.63 | 0.032 | 0.029 | 0.0055 |
| 7 | W7 | 0.06 | 0.12 | 1.6 | 3.5 | 0.33 | 0.23 | 0.56 | 0.031 | 0.029 | 0.0066 |
| 8 | W8 | 0.06 | 0.13 | 1.6 | 4.7 | 0.32 | 0.23 | 0.55 | 0.034 | 0.028 | 0.0065 |
| 9 | W9 | 0.03 | 0.12 | 1.7 | 4.3 | 0.37 | 0.13 | 0.50 | 0.034 | 0.034 | 0.0062 |
| 10 | W10 | 0.04 | 0.12 | 1.7 | 3.3 | 0.36 | 0.14 | 0.50 | 0.032 | 0.033 | 0.0063 |
| 11 | W11 | 0.04 | 0.13 | 1.6 | 4.8 | 0.06 | 0.23 | 0.29 | 0.035 | 0.031 | 0.0055 |
| 12 | W12 | 0.09 | 0.13 | 1.4 | 4.9 | 0.23 | 0.23 | 0.46 | 0.034 | 0.029 | 0.0064 |
| 13 | W13 | 0.06 | 0.46 | 1.4 | 5.0 | 0.02 | 0.15 | 0.17 | 0.038 | 0.03 | 0.0055 |
| 14 | W14 | 0.04 | 0.15 | 1.1 | 4.9 | 0.14 | 0.20 | 0.34 | 0.038 | 0.031 | 0.0056 |
| 15 | W15 | 0.04 | 0.22 | 1.8 | 6.1 | 0.20 | 0.22 | 0.42 | 0.038 | 0.03 | 0.0055 |
| 16 | W16 | 0.04 | 0.15 | 1.6 | 7.2 | 0.21 | 0.20 | 0.41 | 0.032 | 0.031 | 0.005 |
| 17 | W17 | 0.04 | 0.31 | 1.6 | 2.8 | 0.63 | 0.08 | 0.71 | 0.039 | 0.03 | 0.0059 |
| 18 | W18 | 0.08 | 0.30 | 1.6 | 4.8 | 0.15 | 0.45 | 0.60 | 0.014 | 0.039 | 0.006 |
| 19 | W19 | 0.06 | 0.35 | 1.6 | 6.0 | 0.22 | 0.20 | 0.42 | 0.055 | 0.019 | 0.006 |

| Experimental No. | Chemical component composition of welding metal* (percent by mass) | | | | A value | X value | B value | Determination of Mo content | Basicity of flux |
|---|---|---|---|---|---|---|---|---|---|
| | Cu | Al | Nb | V | | | | | |
| 1 | — | — | — | — | 4.74 | 0.93 | 0.41 | x | 2.55 |
| 2 | — | — | — | — | 5.25 | 0.59 | 0.41 | ○ | 2.55 |
| 3 | — | — | — | — | 5.21 | 1.03 | 0.22 | x | 2.55 |
| 4 | — | — | — | — | 4.69 | 0.73 | 0.10 | x | 2.55 |
| 5 | — | — | — | — | 3.82 | 1.11 | 0.30 | ○ | 2.55 |
| 6 | — | — | — | — | 3.85 | 0.93 | 0.29 | ○ | 2.55 |
| 7 | — | — | — | — | 4.29 | 0.89 | 0.25 | ○ | 2.55 |
| 8 | — | — | — | — | 5.49 | 0.99 | 0.25 | ○ | 2.55 |
| 9 | 0.10 | — | — | — | 5.23 | 0.85 | 0.14 | ○ | 2.55 |
| 10 | 0.12 | — | — | — | 4.24 | 0.82 | 0.18 | ○ | 2.55 |
| 11 | — | — | — | — | 5.52 | 0.93 | 0.14 | ○ | 2.55 |
| 12 | — | — | — | — | 5.60 | 0.96 | 0.31 | ○ | 2.55 |
| 13 | — | — | — | 0.041 | 5.65 | 0.72 | 0.17 | ○ | 2.55 |
| 14 | — | — | — | — | 5.40 | 0.99 | 0.10 | ○ | 2.55 |
| 15 | — | — | — | — | 6.95 | 0.93 | 0.17 | ○ | 2.55 |
| 16 | — | — | 0.025 | — | 7.97 | 0.83 | 0.15 | ○ | 2.55 |
| 17 | 0.24 | — | 0.018 | — | 3.82 | 0.86 | 0.20 | x | 2.55 |
| 18 | — | 0.024 | — | 0.086 | 5.45 | 0.51 | 0.29 | ○ | 2.55 |
| 19 | — | — | — | — | 6.77 | 1.51 | 0.23 | ○ | 2.55 |

*Remainder: iron and inevitable impurities

TABLE 6

| Experimental No. | Welding wire No. | Chemical component composition of welding metal* (percent by mass) | | | | | | | | |
|---|---|---|---|---|---|---|---|---|---|---|
| | | C | Si | Mn | Ni | Cr | Mo | Cr + Mo | Ti | O | N |
| 20 | W20 | 0.11 | 0.17 | 1.5 | 4.8 | 0.02 | 0.33 | 0.35 | 0.033 | 0.030 | 0.0044 |
| 21 | W21 | 0.05 | 0.56 | 1.6 | 4.2 | 0.05 | 0.41 | 0.46 | 0.038 | 0.028 | 0.0058 |
| 22 | W22 | 0.04 | 0.13 | 0.9 | 3.8 | 0.15 | 0.24 | 0.39 | 0.032 | 0.031 | 0.0050 |
| 23 | W23 | 0.05 | 0.31 | 2.0 | 4.5 | 0.31 | 0.09 | 0.40 | 0.015 | 0.033 | 0.0051 |
| 24 | W24 | 0.04 | 0.21 | 1.6 | 2.5 | 0.42 | 0.23 | 0.65 | 0.028 | 0.035 | 0.0056 |
| 25 | W25 | 0.04 | 0.40 | 1.2 | 8.2 | 0.27 | 0.33 | 0.60 | 0.03 | 0.032 | 0.0050 |
| 26 | W26 | 0.06 | 0.33 | 1.5 | 5.1 | 0.82 | 0.32 | 1.14 | 0.025 | 0.030 | 0.0062 |
| 27 | W27 | 0.06 | 0.12 | 1.6 | 3.6 | 0.35 | 0.04 | 0.39 | 0.032 | 0.029 | 0.0063 |
| 28 | W28 | 0.05 | 0.17 | 1.4 | 4.7 | 0.51 | 0.04 | 0.55 | 0.031 | 0.028 | 0.0048 |
| 29 | W29 | 0.03 | 0.20 | 1.4 | 4.0 | 0.02 | 0.92 | 0.94 | 0.039 | 0.031 | 0.0052 |
| 30 | W30 | 0.05 | 0.19 | 1.4 | 3.8 | 0.56 | 0.31 | 0.87 | 0.045 | 0.031 | 0.0060 |
| 31 | W31 | 0.03 | 0.08 | 1.5 | 4.3 | 0.37 | 0.22 | 0.59 | 0.008 | 0.051 | 0.0057 |
| 32 | W32 | 0.07 | 0.12 | 1.8 | 7.9 | 0.68 | 0.06 | 0.74 | 0.063 | 0.023 | 0.0049 |
| 33 | W33 | 0.05 | 0.22 | 1.4 | 2.9 | 0.04 | 0.42 | 0.46 | 0.021 | 0.024 | 0.0043 |
| 34 | W34 | 0.03 | 0.13 | 1.2 | 4.6 | 0.32 | 0.31 | 0.63 | 0.035 | 0.061 | 0.0066 |
| 35 | W35 | 0.05 | 0.15 | 1.6 | 4.3 | 0.28 | 0.33 | 0.61 | 0.034 | 0.030 | 0.0113 |
| 36 | W36 | 0.08 | 0.19 | 1.7 | 3.6 | 0.55 | 0.20 | 0.75 | 0.033 | 0.030 | 0.0050 |

TABLE 6-continued

| Experimental No. | Chemical component composition of welding metal* (percent by mass) | | | | A value | X value | B value | Determination of Mo content | Basicity of flux |
|---|---|---|---|---|---|---|---|---|---|
| | Cu | Al | Nb | V | | | | | |
| 20 | — | — | — | — | 5.47 | 0.86 | 0.34 | ○ | 2.55 |
| 21 | — | — | — | — | 4.82 | 0.68 | 0.17 | ○ | 2.55 |
| 22 | — | — | — | — | 4.19 | 0.85 | 0.09 | ○ | 2.55 |
| 23 | — | — | — | — | 5.54 | 0.31 | 0.25 | x | 2.55 |
| 24 | 0.25 | — | — | — | 3.42 | 0.62 | 0.18 | ○ | 2.55 |
| 25 | — | — | — | — | 8.70 | 0.58 | 0.13 | ○ | 2.55 |
| 26 | — | — | — | — | 5.89 | 0.54 | 0.33 | ○ | 2.55 |
| 27 | — | — | — | — | 4.49 | 0.91 | 0.26 | x | 2.55 |
| 28 | — | — | — | — | 5.51 | 0.85 | 0.22 | x | 2.55 |
| 29 | 0.11 | — | — | — | 4.31 | 0.95 | 0.09 | x | 2.55 |
| 30 | — | — | — | — | 4.49 | 1.11 | 0.22 | ○ | 2.55 |
| 31 | — | — | — | — | 5.03 | 0.15 | 0.12 | ○ | 2.55 |
| 32 | 0.28 | — | — | — | 9.10 | 2.17 | 0.39 | x | 2.55 |
| 33 | — | 0.033 | — | — | 3.43 | −16.15 | 0.15 | ○ | 2.55 |
| 34 | — | — | — | — | 5.13 | 0.52 | 0.10 | ○ | 2.04 |
| 35 | — | — | — | — | 5.02 | 0.91 | 0.20 | ○ | 2.55 |
| 36 | 0.41 | — | — | — | 4.72 | 0.84 | 0.40 | ○ | 2.55 |

*Remainder: iron and inevitable impurities

Each of the resultant welding metals was subjected to SR annealing under a condition of 565° C.×4 hours (LMP=17.3×$10^3$) or 615° C.×12 hours (LMP=18.7×$10^3$), and then subjected to measurement of surface area percentage (total area percentage) of carbide particles having a circle-equivalent diameter of 0.20 μm or greater and the number of carbide particles having a circle-equivalent diameter of 1.0 μm or greater according to the following procedures, subjected to evaluation of each of tensile strength (TS), low-temperature toughness ($vE_{-74}$), and drop-weight characteristics under the following conditions.

[Measurement of Surface Area Percentage of Carbide Particles Having a Circle-Equivalent Diameter of 0.20 μm or Greater]

Test pieces for replica TEM (Transmission Electron Microscope) observation were sampled from the center of the final pass of each welding metal subjected to the SR annealing. TEM images were photographed at 7500-fold magnification in four optional fields for each of the test pieces, and each piece of carbide particles having a circle-equivalent diameter of 0.20 μm or greater was selected, and the surface area percentage of the carbide particles was calculated through image analysis using image analysis software (Image-Pro Plus manufactured by Media Cybernetics). At this time, carbide particles and oxide particles having a circle-equivalent diameter of 1.0 μm or greater were distinguished by EDS analysis.

[Measurement of the Number of Carbide Particles Having a Circle-Equivalent Diameter of 1.0 μm or Greater]

Similar to the procedure described above, particles having a circle-equivalent diameter of 1.0 μm or greater were selected by the replica TEM (Transmission Electron Microscope), and carbide particles were selected from these particles by EDS analysis. The number density was calculated through image analysis.

[Tensile Strength of Welding Metal]

Tensile test pieces (test pieces according to JIS Z3111 A2) were sampled (FIG. 1(a)) from the center of each welding metal subjected to the SR annealing in a direction of the welding line, and were each subjected to a tensile test according to the procedure of JIS Z2241 for measurement of tensile strength (TS). Any sample having the tensile strength TS of more than 620 MPa was determined to be acceptable.

[Evaluation of Low-Temperature Toughness of Welding Metal]

Charpy impact test pieces (test pieces according to JIS Z 31114 (V-notch test pieces)) were sampled (FIG. 1(b)) from the center of each welding metal subjected to the SR annealing in a direction of the welding line for the Charpy impact test performed three times at −74° C. according to JIS Z 2242 for each welding metal, and the average of absorbed energy at −74° C. ($vE_{-74}$) was determined for each welding metal. Any sample having the absorbed energy ($vE_{-74}$) more than 70 J was determined to be excellent in low-temperature toughness.

[Evaluation of Drop-Weight Characteristics]

P-3 test pieces were each sampled from the center of each welding metal, and used for a drop weight test at −160° F. (−107° C.) according to ASTM E208 (2006)(FIG. 1(c)). Any unbroken sample was determined to be excellent in drop-weight characteristics ("○").

These measurement results (the surface area percentage of carbide particles, the number density, the tensile strength, the drop-weight characteristics, and the low-temperature toughness ($vE_{-74}$)) are shown in the following Tables 7 and 8 for each of the SR annealing conditions.

TABLE 7

| | | SR annealing condition (565° C. × 4 hr) | | | | |
|---|---|---|---|---|---|---|
| Experimental No. | Welding wire No. | Surface area percentage of carbide particles having circle-equivalent diameter of 0.2 μm or greater (%) | Number density of carbide particles having circle-equivalent diameter of 1.0 μm or greater (particles/mm²) | TS (MPa) | Drop-weight characteristics | $vE_{-74}$ (J) |
| 1 | W1 | 3.7 | 781 | 774 | ○ | 100 |
| 2 | W2 | 3.7 | 0 | 751 | ○ | 95 |

TABLE 7-continued

| | | | SR annealing condition (615° C. × 12 hr) | | | |
|---|---|---|---|---|---|---|
| Experimental No. | Welding wire No. | Surface area percentage of carbide particles having circle-equivalent diameter of 0.2 μm or greater (%) | Number density of carbide particles having circle-equivalent diameter of 1.0 μm or greater (particles/mm²) | TS (MPa) | Drop-weight characteristics | vE$_{-74}$ (J) |
| 3 | W3 | 3.4 | 781 | 723 | ○ | 111 |
| 4 | W4 | 3.0 | 781 | 702 | ○ | 113 |
| 5 | W5 | 2.4 | 0 | 814 | ○ | 92 |
| 6 | W6 | 2.5 | 0 | 757 | ○ | 93 |
| 7 | W7 | 2.0 | 0 | 756 | ○ | 117 |
| 8 | W8 | 1.8 | 0 | 828 | ○ | 119 |
| 9 | W9 | 1.1 | 0 | 747 | ○ | 146 |
| 10 | W10 | 1.6 | 0 | 703 | ○ | 151 |
| 11 | W11 | 1.2 | 0 | 692 | ○ | 158 |
| 12 | W12 | 2.5 | 0 | 859 | ○ | 86 |
| 13 | W13 | 1.8 | 0 | 767 | ○ | 118 |
| 14 | W14 | 1.0 | 0 | 665 | ○ | 172 |
| 15 | W15 | 1.5 | 0 | 720 | ○ | 148 |
| 16 | W16 | 1.2 | 0 | 751 | ○ | 108 |
| 17 | W17 | 2.2 | 781 | 727 | ○ | 125 |
| 18 | W18 | 2.9 | 0 | 760 | ○ | 88 |
| 19 | W19 | 1.6 | 0 | 794 | ○ | 123 |

| | SR annealing condition (615° C. × 12 hr) | | | | |
|---|---|---|---|---|---|
| Experimental No. | Surface area percentage of carbide particles having circle-equivalent diameter of 0.2 μm or greater (%) | Number density of carbide particles having circle-equivalent diameter of 1.0 μm or greater (particles/mm²) | TS (MPa) | Drop-weight characteristics | vE$_{-74}$ (J) |
| 1 | 3.9 | 781 | 720 | ○ | 72 |
| 2 | 3.8 | 781 | 688 | ○ | 85 |
| 3 | 3.5 | 781 | 677 | ○ | 95 |
| 4 | 3.2 | 781 | 678 | ○ | 99 |
| 5 | 2.4 | 0 | 762 | ○ | 103 |
| 6 | 2.6 | 0 | 726 | ○ | 107 |
| 7 | 1.9 | 0 | 746 | ○ | 136 |
| 8 | 1.9 | 0 | 773 | ○ | 140 |
| 9 | 1.2 | 0 | 702 | ○ | 165 |
| 10 | 1.6 | 0 | 680 | ○ | 166 |
| 11 | 1.2 | 0 | 648 | ○ | 161 |
| 12 | 2.4 | 0 | 801 | ○ | 117 |
| 13 | 2 | 0 | 754 | ○ | 110 |
| 14 | 1.1 | 0 | 633 | ○ | 175 |
| 15 | 1.6 | 0 | 685 | ○ | 164 |
| 16 | 1.4 | 0 | 749 | ○ | 96 |
| 17 | 2.5 | 781 | 681 | ○ | 123 |
| 18 | 3.2 | 0 | 702 | ○ | 80 |
| 19 | 1.8 | 0 | 748 | ○ | 139 |

TABLE 8

| | | SR annealing condition (565° C. × 4 hr) | | | | |
|---|---|---|---|---|---|---|
| Experimental No. | Welding wire No. | Surface area percentage of carbide particles having circle-equivalent diameter of 0.2 μm or greater (%) | Number density of carbide particles having circle-equivalent diameter of 1.0 μm or greater (particles/mm²) | TS (MPa) | Drop-weight characteristics | vE$_{-74}$ (J) |
| 20 | W20 | 2.8 | 0 | 878 | x | 56 |
| 21 | W21 | 1.6 | 0 | 773 | x | 64 |
| 22 | W22 | 1.4 | 0 | 618 | ○ | 66 |
| 23 | W23 | 3.7 | 1563 | 738 | x | 57 |
| 24 | W24 | 1.7 | 0 | 705 | x | 64 |
| 25 | W25 | 1.1 | 0 | 760 | x | 50 |
| 26 | W26 | 3.6 | 0 | 805 | x | 42 |
| 27 | W27 | 3.4 | 2344 | 684 | x | 60 |
| 28 | W28 | 3.5 | 3125 | 680 | x | 68 |
| 29 | W29 | 3.7 | 3906 | 793 | x | 35 |
| 30 | W30 | 1.8 | 0 | 796 | x | 78 |
| 31 | W31 | 2.0 | 0 | 651 | x | 51 |
| 32 | W32 | 3.9 | 3125 | 871 | x | 22 |
| 33 | W33 | 2.8 | 0 | 739 | x | 50 |
| 34 | W34 | 1.2 | 0 | 710 | ○ | 65 |
| 35 | W35 | 1.5 | 0 | 797 | x | 63 |
| 36 | W36 | 4.2 | 0 | 809 | x | 53 |

TABLE 8-continued

| | SR annealing condition (615° C. × 12 hr) | | | | |
|---|---|---|---|---|---|
| Experimental No. | Surface area percentage of carbide particles having circle-equivalent diameter of 0.2 μm or greater (%) | Number density of carbide particles having circle-equivalent diameter of 1.0 μm or greater (particles/mm²) | TS (MPa) | Drop-weight characteristics | $vE_{-74}$ (J) |
| 20 | 3.1 | 0 | 808 | ○ | 68 |
| 21 | 1.5 | 0 | 717 | x | 54 |
| 22 | 1.7 | 0 | 602 | ○ | 124 |
| 23 | 4 | 2344 | 705 | x | 48 |
| 24 | 1.5 | 0 | 668 | x | 58 |
| 25 | 1.2 | 0 | 708 | x | 45 |
| 26 | 3.8 | 781 | 773 | x | 75 |
| 27 | 3.7 | 3125 | 611 | x | 47 |
| 28 | 3.6 | 3125 | 602 | x | 45 |
| 29 | 3.8 | 5469 | 733 | x | 34 |
| 30 | 2 | 0 | 745 | x | 60 |
| 31 | 2.3 | 0 | 608 | x | 59 |
| 32 | 4.1 | 3906 | 825 | x | 53 |
| 33 | 3 | 0 | 675 | x | 42 |
| 34 | 1.4 | 0 | 675 | ○ | 63 |
| 35 | 1.7 | 0 | 736 | x | 55 |
| 36 | 4.4 | 0 | 741 | x | 66 |

The following consideration is derived from these results (in the following description, "No." indicates each experiment number in Tables 7 and 8). Nos. 1 to 19 are examples satisfying the requirements specified by the present invention, in each of which a chemical component composition, the A value and the X value are appropriately controlled, thus providing a welding metal having excellent strength, low-temperature toughness, and drop-weight characteristics.

In contrast, Nos. 20 to 36 are examples in each of which at least one of the requirements specified by the present invention is not satisfied, and at least one characteristic is inferior. Among them, No. 20 is an example where the C content exceeds the range specified by the present invention, and therefore the low-temperature toughness and the drop-weight characteristics are degraded though the strength is high. No. 21 is an example where the Si content exceeds the range specified by the present invention, and therefore both the low-temperature toughness and the drop-weight characteristics are degraded though the strength is high.

No. 22 is an example where the Mn content is lower than the range specified by the present invention, and therefore the required strength is not obtained. No. 23 is an example where the Mn content exceeds the range specified by the present invention (the X value is also low) and the number density of coarse carbide particles is increased, and therefore the low-temperature toughness and the drop-weight characteristics are degraded.

No. 24 is an example where the Ni content is lower than the range specified by the present invention, and therefore both the low-temperature toughness and the drop-weight characteristics are degraded. No. 25 is an example where the Ni content exceeds the range specified by the present invention, and therefore both the low-temperature toughness and the drop-weight characteristics are degraded though the strength is high.

No. 26 is an example where the Cr content exceeds the range specified by the present invention (the total content of Cr and Mo is also excessive), and therefore both the low-temperature toughness and the drop-weight characteristics are degraded though the strength is high. Nos. 27 and 28 are examples where the Mo content is lower than the range specified by the present invention and the number density of coarse carbide particles is increased, and therefore both the low-temperature toughness and the drop-weight characteristics are degraded. No. 29 is an example where the Mo content exceeds the range specified by the present invention (the total content of Cr and Mo is also excessive) and the number density of coarse carbide particles is increased, and therefore both the low-temperature toughness and the drop-weight characteristics are degraded. No. 30 is an example where the total content of Cr and Mo exceeds the range specified by the present invention, and therefore the low-temperature toughness and the drop-weight characteristics are degraded though the strength is high.

No. 31 is an example where the Ti content is lower than the range specified by the present invention (the X value is also low), and therefore both the low-temperature toughness and the drop-weight characteristics are degraded. No. 32 is an example where the Ti content exceeds the range specified by the present invention (The A value is also high) and the number density of coarse carbide particles is increased, and therefore both the low-temperature toughness and the drop-weight characteristics are degraded though the strength is high.

No. 33 is an example where the A value and the X value are low (the Al content is also excessive), and therefore both the low-temperature toughness and the drop-weight characteristics are degraded. No. 34 is an example where the O content exceeds the range specified by the present invention, and therefore the low-temperature toughness is degraded though the strength is high.

No. 35 is an example where the N content exceeds the range specified by the present invention, and therefore the low-temperature toughness and the drop-weight characteristics are degraded though the strength is high. No. 36 is an example where the content of Cu, which is an optional component, exceeds the range specified by the present invention, and therefore the low-temperature toughness and the drop-weight characteristics are degraded though the strength is high.

Although the present invention has been described in detail with reference to the particular embodiment, it will be apparent for those skilled in the art that various alterations and modifications of the embodiment can be made within the scope without departing from the spirit and the scope of the present invention.

This application is based on Japanese Unexamined Patent Application filed on Apr. 9, 2010 (Japanese Unexamined Patent Application Publication No. 2010-090444), all the content of which is incorporated herein by reference.

Industrial Applicability

The welding metal of the present invention is useful as a Mn—Mo—Ni-series welded structure in a nuclear power field.

The invention claimed is:

1. A welding metal, comprising iron and, by mass percent based on a total mass of the welding metal:
   from 0.02% to 0.10% of C;
   from 0.5% or less (excluding 0%) of Si;
   from 1.0% to 1.9% of Mn;
   from 2.7% to 8.0% of Ni;
   from 0.7% or less (excluding 0%) of Cr;
   from 0.05% to 0.8% of Mo;
   from 0.010% to 0.060% of Ti;
   from 0.010% or less (excluding 0%) of N; and
   from 0.015% to 0.060% of O,
   wherein:
   a total content of Cr and Mo is 0.8% or less (excluding 0%);
   an A value defined by formula (1) is 3.8% to 9.0%:

$$A \text{ value} = 0.8 \times [C] - 0.05 \times [Si] + 0.5 \times [Mn] + 0.5 \times [Cu] + [Ni] - 0.5 \times [Mo] + 0.2 \times [Cr] \quad (1),$$

wherein [C], [Si], [Mn], [Cu], [Ni], [Mo], and [Cr] are contents (by mass percent) of C, Si, Mn, Cu, Ni, Mo, and Cr in the welding metal, respectively;
   an X value defined by formula (2) is 0.5 or greater:

$$X \text{ value} = [Ti] / ([O] - 1.1 \times [Al] + 0.05 \times [Si]) \quad (2),$$

where [Ti], [O], [Al], and [Si] are contents (by mass percent) of Ti, O, Al, and Si in the welding metal, respectively;
   a surface area percentage of carbide particles having a circle-equivalent diameter of 0.20 μM or greater in the welding metal is 4.0% or less; and
   the number of carbide particles having a circle-equivalent diameter of 1.0 μm or greater is 1000 particles/mm² or less.

2. The welding metal of claim 1, wherein a B value defined by formula (3) is 0.35% or less:

$$B \text{ value} = [C] = (2 \times [Mn] + 3 \times [Cr]) \quad (3),$$

wherein [C], [Mn], and [Cr] are contents (by mass percent) of C, Mn, and Cr in the welding metal, respectively.

3. The welding metal of claim 1, wherein [C], the C content, and [Mo], the Mo content, satisfy formula (4):

$$0.01 + 2.2 \times [C] < [Mo] < 0.2 + 15 \times [C] \quad (4).$$

4. The welding metal of claim 1, further comprising Cu of 0.35% or less (excluding 0%).

5. The welding metal of claim 1, further comprising Al of 0.03% or less (excluding 0%).

6. The welding metal of claim 1, further comprising Nb of 0.030% or less (excluding 0%), and/or V of 0.10% or less (excluding 0%).

7. A welded structure, comprising the welding metal of claim 1.

8. The welding metal of claim 1, wherein the A value defined by formula (1) is from 4.5% to 9.0%.

9. The welding metal of claim 1, wherein the X value defined by formula (2) is 0.6 or greater.

10. The welding metal of claim 1, wherein the surface area percentage of carbide particles having a circle-equivalent diameter of 0.20 μm or greater in the welding metal is 3.5% or less.

11. The welding metal of claim 2, wherein the B value defined by formula (3) is 0.30% or less.

12. The welding metal of claim 1, wherein the content of C in the welding metal is from 0.04% to 0.08% by mass.

13. The welding metal of claim 1, wherein the content of Si in the welding metal is from 0.05% to 0.4% by mass.

14. The welding metal of claim 1, wherein the content of Mn in the welding metal is from 1.2% to 1.8% by mass.

15. The welding metal of claim 1, wherein the content of Ni in the welding metal is from 3.0% to 7.0% by mass.

16. The welding metal of claim 1, wherein the content of Cr in the welding metal is from 0.05% to 0.6% by mass.

17. The welding metal of claim 1, wherein the content of Mo in the welding metal is from 0.1% to 0.6% by mass, and the total content of Cr and Mo is from 0.1% to 0.7% by mass.

18. The welding metal of claim 1, wherein the content of Ti in the welding metal is from 0.015 to 0.05% by mass.

19. The welding metal of claim 1, wherein the content of N in the welding metal is 0.0008% by mass or less (excluding 0%).

20. The welding metal of claim 1, wherein the content of O in the welding metal is from 0.02 to 0.05% by mass.

* * * * *